(12) United States Patent
Martinson

(10) Patent No.: US 11,091,349 B2
(45) Date of Patent: Aug. 17, 2021

(54) CONTROLLER FOR TARP SYSTEM

(71) Applicant: Todd Martinson, Saugatuck, MI (US)

(72) Inventor: Todd Martinson, Saugatuck, MI (US)

( * ) Notice: Subject to any disclaimer, the term of this patent is extended or adjusted under 35 U.S.C. 154(b) by 0 days.

(21) Appl. No.: 16/406,016

(22) Filed: May 8, 2019

(65) Prior Publication Data
US 2020/0354188 A1  Nov. 12, 2020

Related U.S. Application Data

(60) Provisional application No. 62/668,445, filed on May 8, 2018.

(51) Int. Cl.
*B60P 7/02* (2006.01)
*B65H 75/44* (2006.01)
*B60J 7/06* (2006.01)
*B60J 11/02* (2006.01)

(52) U.S. Cl.
CPC .......... *B65H 75/4486* (2013.01); *B60J 7/068* (2013.01); *B60J 11/025* (2013.01); *B60Y 2200/14* (2013.01)

(58) Field of Classification Search
CPC ..... B65H 75/4486; B60J 11/025; B60J 7/068; B60Y 2200/14
See application file for complete search history.

(56) References Cited

U.S. PATENT DOCUMENTS

| 5,829,819 | A | 11/1998 | Searfoss |
| 5,924,758 | A | 7/1999 | Dimmer et al. |
| 6,916,060 | B2 | 7/2005 | Searfoss |
| 7,726,720 | B2 | 6/2010 | Searfoss |
| 8,666,595 | B2 | 3/2014 | Kartes |
| 2007/0024217 | A1* | 2/2007 | Dodge ...................... H02P 1/54 318/108 |
| 2012/0281444 | A1* | 11/2012 | Dent ....................... H02M 1/32 363/56.01 |
| 2017/0086281 | A1* | 3/2017 | Avrahamy ............. A01G 7/045 |
| 2018/0326813 | A1* | 11/2018 | Ganiere ............. B60H 1/00428 |

* cited by examiner

*Primary Examiner* — Muhammad S Islam

(57) ABSTRACT

The electrical system between the battery and the tarp motor uses a significant amount of heavy cabling to deliver the power required. Disclosed are electrical systems to reduce the amount of wire necessary by employing the vehicle body for the electrical ground; momentarily configuring the battery bank to raise the voltage; and a control system to simplify the user interface.

10 Claims, 8 Drawing Sheets

CONTROLLER FOR TARP SYSTEM

CROSS-REFERENCE TO RELATED APPLICATION

This application claims the benefit of U.S. Provisional Application No. 62/668,445, filed May 8, 2018.

BACKGROUND

State and federal regulations have gone into effect across much of the United States requiring dump trucks operating on the highway system to cover their load to prevent debris from dropping, blowing, or otherwise escaping the dump bed or hopper of the vehicle. Drivers that operate these vehicles without their loads covered may be charged with simple traffic infractions or be subject to more severe misdemeanors in the case where the loose debris causes personal injury or damages property. In response to the regulations, operators of these vehicles have adopted automatic tarping systems.

The automatic tarping system allows the operator to remotely cover and uncover the truck bed with a tarp through a simple control interface. For the operator, the controls may simply be a two-position rocker switch, conveniently located in the cab or some other easily accessible point on the vehicle, which commands the tarping system to deploy or retract.

At the bed of the truck, the tarp is drawn around a spool located on the bed opposite the tailgate. The leading edge of tarp is pulled from the spool and guided by a pair of spring-loaded arms known as the bail assembly. A high-torque electrical motor is coupled to the axis of the spool. The request of the operator, by way of the control interface, causes the motor to either wind or unwind the tarp.

The electrical system between the vehicle power source and the electrical motor requires a significant amount of heavy-gauge cabling to deliver the power required. The electrical system also utilizes a control system and/or switching devices, such as relays, to receive the users request and drive the electrical distribution to the motor.

The present application provides means to reduce the costs of electrical system and improve the intelligence of the controls.

SUMMARY OF THE INVENTION

The tarping system for a dump truck generally comprises a flexible tarp, sized to cover the truck bed, which is drawn from a spool located opposite the tailgate. The leading edge of the tarp is guided by a set of spring-loaded arms configured to pull the tarp over the truck bed. The axis of the spool is coupled to a reversible DC electrical motor which either draws or releases the tarp over the bed.

The present application addresses the electrical system that exists between the vehicle power source and the motor terminals. In the U.S. the vehicle power source used to drive the tarping system motor is the 12-volt rail of the vehicle's battery bank. The amperage required to drive the tarp motor may be in excess of 100 amps and may fluctuate due to motor conditions such as stall, operating, and starting conditions—as well as in response to a non-liner torque requirement from the tarping system mechanics. As the battery system is often located near the cab of the truck, and the electrical drive motor is positioned at a point high on the bed and opposite the tailgate, the electrical cabling must extend from the cab, to the point where the bed is hinged at the rear of the vehicle, and then traverse back the length of the bed to the motor. For a large vehicle application, such as a 40' end-dump truck, this application would require nearly 100 feet of two-conductor, 6-gauge copper cabling.

Disclosed herein are vehicle electrical system configurations to reduce the amount of wire necessary to control the electrical drive motor by employing the vehicle body for the electrical ground; configurations to reduce the wire gauge by momentarily configuring the existing battery bank to raise the available voltage to the motor; and an intelligent control system to simplify and improve the user interface.

DETAILED DESCRIPTION OF THE INVENTION

In response to federal and state regulations, automatic tarping systems have been employed by vehicles configured to haul materials in a hopper or bed 16, such as dump trucks, to eliminate the debris 18 from escaping the bed 16.

Figure 1:
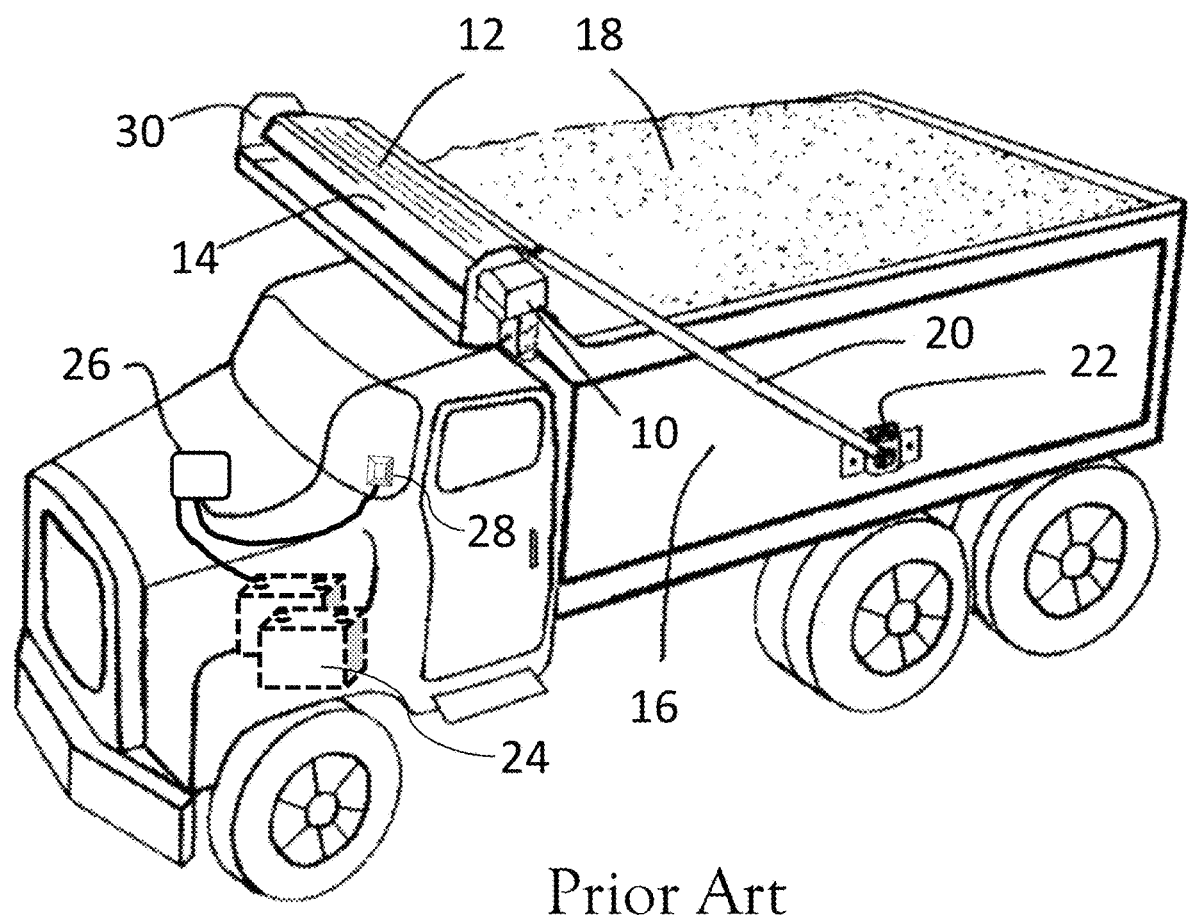
FIG. 1 shows the major components of the tarping system.

FIG. 1 is provided to show the major components of a typical automatic tarping system. The typical configuration includes a tarp 12 which is wound around a spool 14 supported by a spool bracket 30 located at a high point of the bed 16 opposite the tailgate. The trailing edge of the tarp 12 is connected to the spool 14. The leading edge of the tarp 12 is held under tension by a pair of spring-loaded bail arms 20 which pull and guide the tarp 12 over the truck bed 16. A direct-current electrical motor 10 has a shaft coupled to the axis of the spool 14 and may deploy, retract, or hold the tarp 12 in place. Operator controls 28 to deploy or retract the tarp are commonly located either in the cab or at a user accessible position on the body of the vehicle. The tarping system receives power from the vehicle's battery bank 24 and delivers the power through heavy two-conductor cabling. The cabling is of significant length as it traverses from the battery bank 24, along the frame to the rear of the vehicle where the bed 16 is hinged to the frame, and then back along the bed to the motor 10. The direction of the electrical motor 10, which in-turn either deploys, retracts, or holds the tarp 12, is dependent upon the polarity of the signal across the poles of the motor 10.

Dual Voltage Motor Driver

It is common for the tarp motor 10 to operate off the vehicles system voltage, which is generally 12-volts in the U.S. Due to the high-torque which the motor must overcome and subsequent high electrical currents, heavy cabling is used between the vehicle power supply 24 and the tarp motor 10.

The mechanical power required by the motor 10 would be identical regardless of being a 12-volt system or a 24-volt system, and the corresponding 12-volt and 24-volt motors often have similar efficiencies in converting the incoming electrical power to mechanical power. Thus, if the electrical power requirement remains nearly identical and the voltage doubles, the required current for operation is halved. By reducing the electrical current, a lower gauge conductor may be used for the application. The following section outlines an electrical system which utilizes the existing 12-volt vehicle batteries to create a high-voltage system and thus reduce the required motor current.

Figure 2:
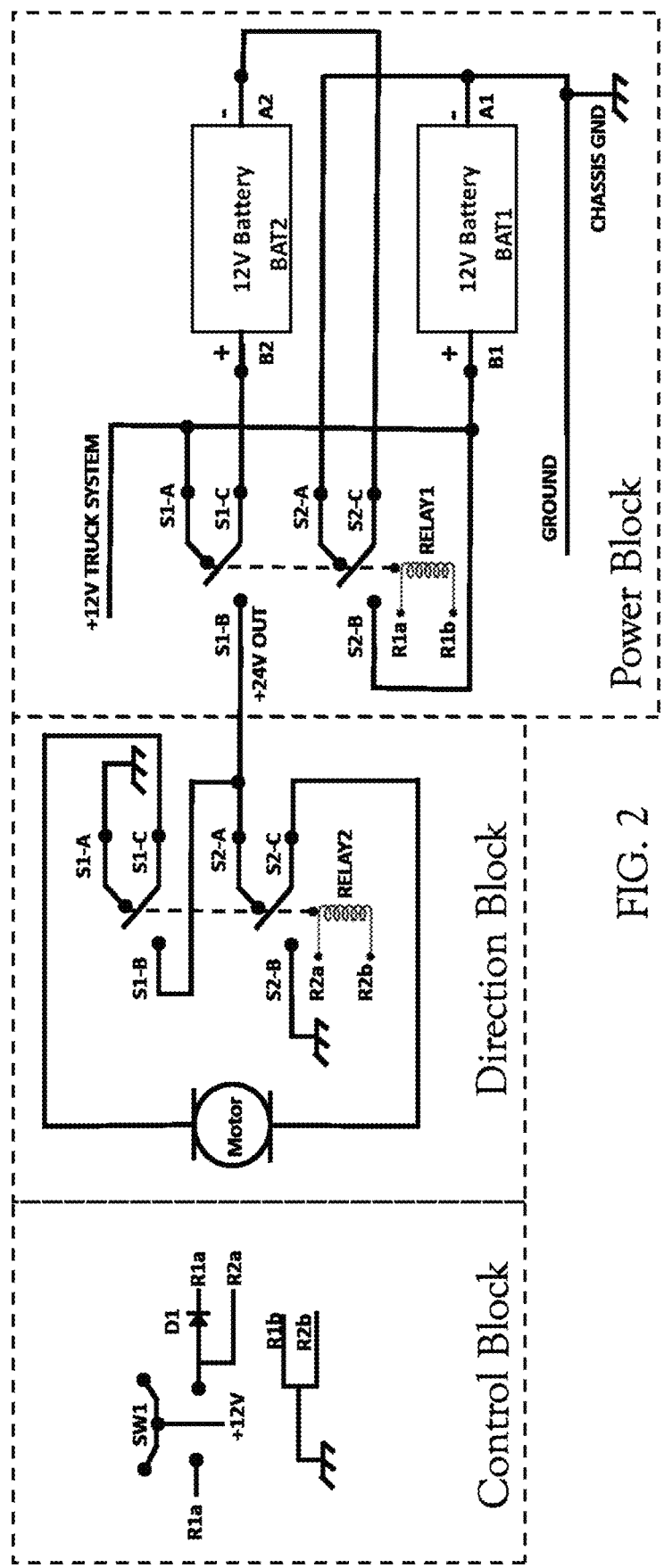
FIG. 2 shows a schematic of the electrical system broken into three blocks.

The battery system 24 of most heavy-duty vehicles may comprise of two or more 12-volt batteries connected in parallel. The power block of FIG. 2 is a schematic showing how one battery may be selectively switched from the parallel circuit to a series circuit in order to create a 24-volt potential to drive the tarp motor. When Relay1 is energized by the activation of the power supply control signal across R1a and R1b, the following events occur: (1) contacts S2-C and S2-B connect the negative output of Battery 2 (identified as A2) to the positive output of battery 1 (identified as B1) which places the batteries in series, and (2) contacts S1-C and S1-B connect which provides 24 volts from the batteries in series to the direction block. When Relay1 is disengaged, no positive potential voltage is available from the power block to the direction block as an open-circuit appears on terminal S1-B of Relay1.

In the direction block shown in FIG. 2, a switching device is shown as Relay2 and is configured to either pass or invert the polarity provided by the power block to the motor, which in-turn commands the direction of the tarp motor 10. Relative to the poles of the motor, the direction block may operate between a positive drive, negative drive, or a non-powered drive depending on the signals provided by the control block. When Relay2 is energized by the activation of the polarity selection signal across R2a and R2b, the motor receives either a positive signal or an open-circuit on terminal S1-B of Relay2, dependent upon the state of the power supply control signal, and a grounded signal from terminal S2-B. When Relay 2 is disengaged, the motor receives a positive signal or open-circuit from S2-A, again, dependent upon the state of the power supply control signal, and a grounded signal from S1-A.

The control block shown in FIG. 2 is illustrated as a simple rocker switch SW1 to provide the power supply control signal and polarity selection signal to Relay1 and Relay2 respectively and is provided as a non-limiting example of a control block. Alternative embodiments may include more sophisticated control elements such as microcontroller systems, advanced sensors including current and voltage measurement devices, fuses, mechanical position sensors, timers, and such.

Figure 5:
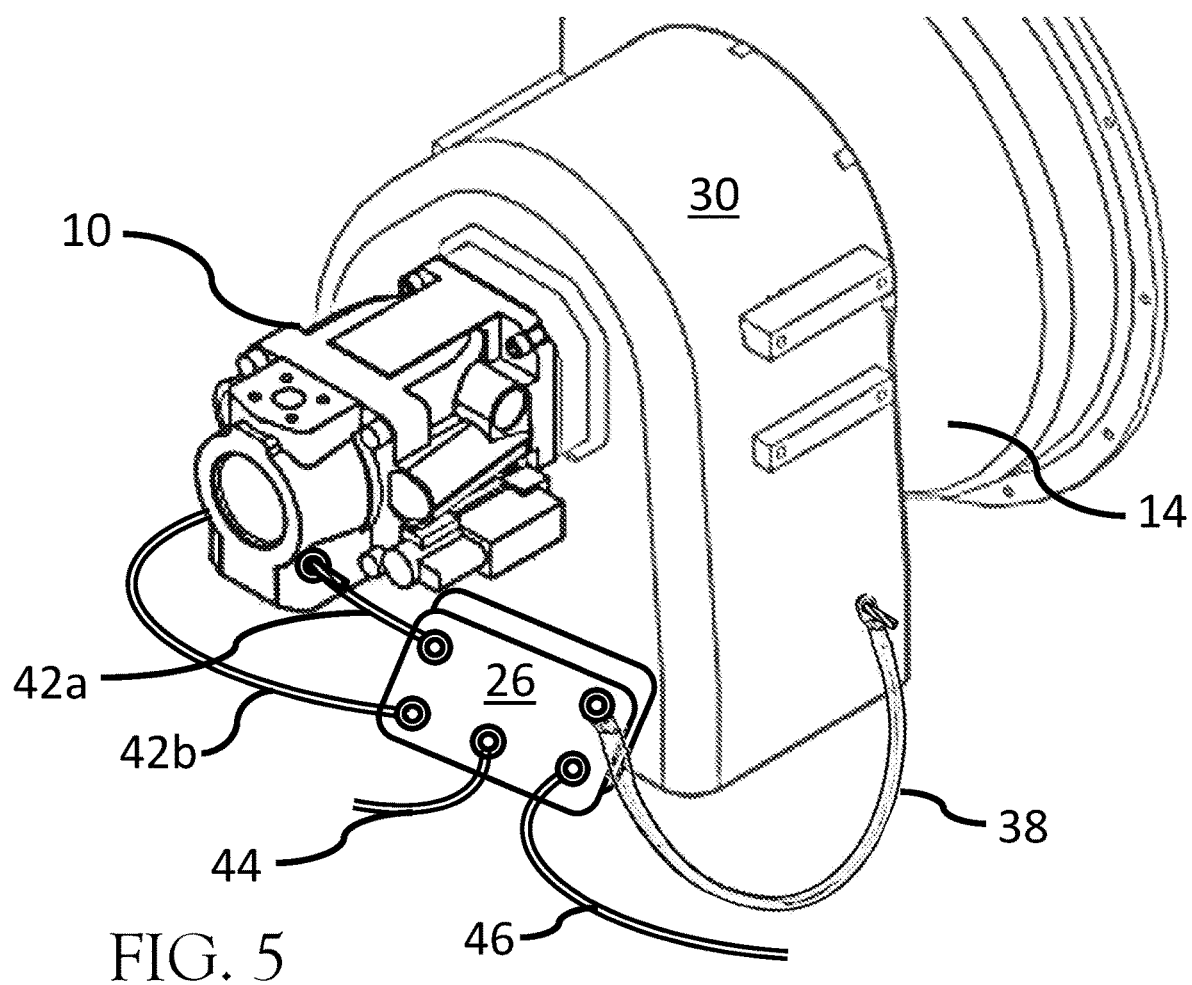
FIG. 5 shows the controller positioned in close proximity to the tarp motor.

While the schematic shows the blocks in close communication, they may be located at different locations throughout the vehicle. In one embodiment, the switching device of the direction block may be located near the tarp motor 10, while in another embodiment, both Relay1 and Relay2 may be located in close proximity of the battery bank 24, or even within a single controller 26. In either case, the positive signal or open-circuit is carried by a high-voltage conductor between the power block and the direction block. The negative or ground signal from the power block may be carried by a wire conductor to the direction block or may be carried by a combination of conductors including the vehicle chassis, ground straps, and metallic bed 16. An illustration of the direction block located in close proximity of the motor 10 is shown in FIG. 5 whereas the motor conductors are shown as 42a and 42b, a control signal is provided via the control cable 44, the grounded supply for the power block is carried to the controller 26 by the ground strap 38 coupled to the bed 16, and the positive signal is carried by the positive conductor 46.

As stated earlier, to retract the tarp 12 from the covered position, the electric motor 10 must transform the electrical energy into the mechanical energy necessary to wind the tarp in. The automatic tarping system illustrated in FIG. 1 requires the highest level of motor torque to lift and pull the tarping system from the extended position.

To illustrate the benefit of increasing the voltage, the following is offered as a non-limiting example. Table 1 provides the electrical current and mechanical torque for a 12-volt motor suited for this application and includes the electrical power required, mechanical power delivered, and motor efficiency.

TABLE 1

| | Electrical Motor Performance | | | | | |
|---|---|---|---|---|---|---|
| | Volt (V) | Current (A) | Electric Power In (W) | Torque (N m) | Rotation (t/min) | Mechanical Power Out (W) | Efficiency (%) |
| No-Load | 12.121 | 14.62 | 178.1 | .68 | 52 | 3.70 | 20.79 |
| Max Torque | 11.994 | 61.62 | 740.0 | 38.2 | 39.8 | 159.47 | 21.55 |

If the application were designed for maximum torque of 38.2 N.m. from this motor, the electrical power required is given as 740 Watts (P1) to produce mechanical power of 159 Watts (P2). On a 12-volt system, the electrical current into the motor at this torque is 61.6 Amps. If the application were designed to account for a potential increase of 50% more current for motor starting/stall conditions, various temperatures, and other factors, the resulting 93-amp circuit design would require 6-gauge (4.115 mm) copper wiring for the power cabling per the American Wire Gauge standards for chassis wiring.

Given the same mechanical torque requirements and similar motor efficiencies, a motor requiring 740 Watts (P1) on a 24-volt system would require 30.8 Amps. Following the previous guidelines in designing for 50% increase in current, the requirements for the resulting 46-amp circuit design is satisfied using 11-gauge (2.305 mm) wiring per the American Wire Gauge standards.

Given the significant length of wiring used for these applications, there is a major cost benefit achieved in reducing the required copper by 68.6% as demonstrated in this example.

Figure 3:
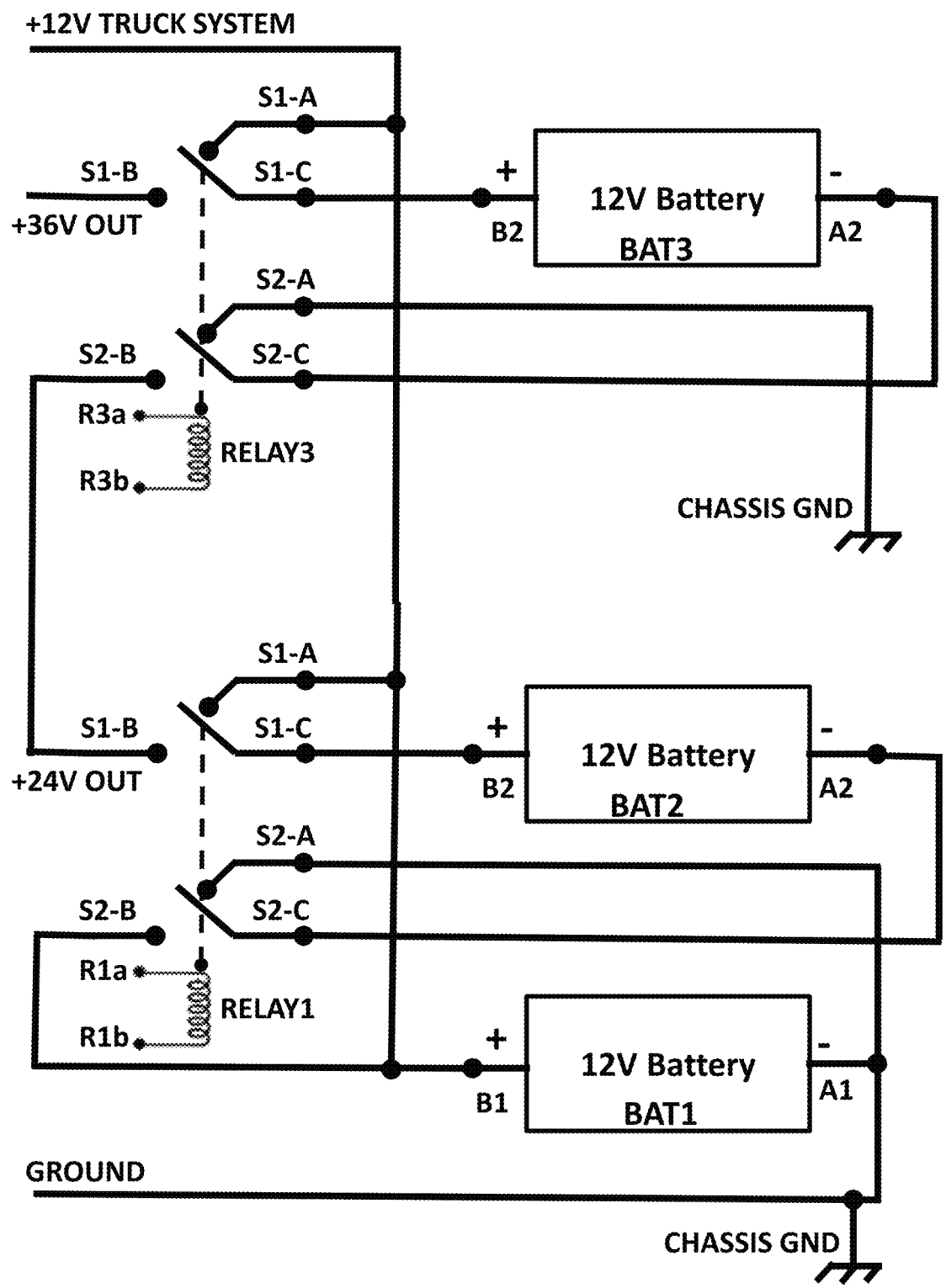
FIG. 3 shows a schematic of the power block of the electrical system implemented with multiple batteries.

As vehicles may be equipped with multiple batteries, the same general circuit can be employed to further increase the voltage. FIG. 3 shows a method to switch 3 batteries from parallel configuration to series to create a 36V potential to further reduce the current required. On a 36-volt system and following the same guidelines as the previous example, the resulting current is 30.8 amps enabling a 14-gauge wire to meet the requirements.

Chassis Ground Configuration

The battery 24 bank is often located near the cab of the truck and the electrical drive motor 10 is positioned at a point opposite the tailgate, as such, the electrical cabling must extend from the cab, to the point where the bed 16 is hinged to the frame at the rear of the vehicle, and then traverse back the length of the bed 16 to the motor 10. For a large vehicle application, such as a 40' end-dump truck, this application would currently require nearly 100 feet of two-conductor, 6-gauge copper cabling. One of the conductors would carry the positive voltage, while the other conductor would provide the ground return path.

It is common for the chassis of the vehicle to provide an electrical grounding point for vehicle motors and accessories. Higher current items, such as the starter motor, often have a braded cable or a ground strap attached to the chassis to provide the return path. Although steel is not as efficient a conductor relative to copper, the sectional area of the vehicle allows it to overcome potential voltage drops.

Figure 4:
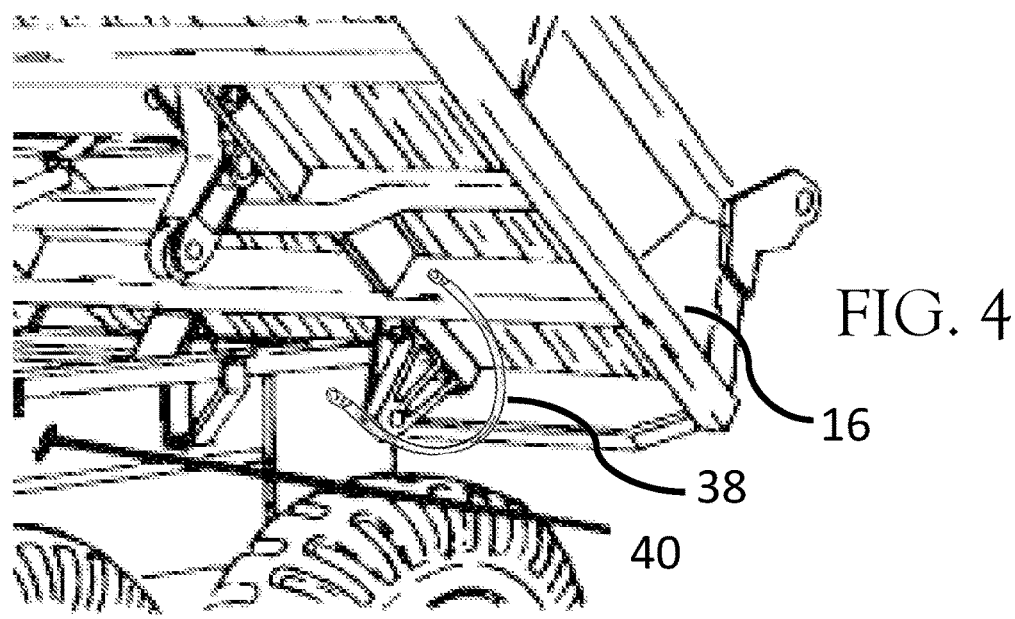
FIG. 4 shows a grounding strap electrically connecting the vehicle chassis ground to the vehicle bed.

In FIG. 4 a ground strap 38 is used to electrically connect the vehicle chassis to the metal bed 16 on applications where the return ground path between the bed and chassis is either not reliable, causes too large of a voltage drop, or presents a spark hazard. The ground strap 38 is preferably a metallic braded cable terminated on each end with ring connections and may be insulated to prevent corrosion or damage. The preferred metal is copper, but as the length is short relative to the application, other metals work as well. In the preferred embodiment, the ground strap 38 would be located near the hinged portion of the dump bed 16. In another embodiment, there may be more than one ground strap 38 to increase reliability or handle additional currents. The ground strap 38 may be secured to either the truck frame or the bed by either a weld joint or removable mechanical means, such as a bolt passing through the opening in the ring connection, wherein the bolt is then mated to a threaded opening the frame. A serrated washer may be used to create a penetrating connection between the ground strap connector and the chassis or bed. A cap device and dielectric grease may be used to cover the connection to reduce corrosion.

For systems which do not utilize the dual-voltage system presented, the positive terminal of the battery 24 may be connected to a positive single-conductor cable 46 that traverses across the vehicle to the direction block controller 26 located near the tarp motor 10. For systems which to utilize the multiple batteries in series as presented, the switched high-voltage may be carried by the positive single conductor cable 46. In either scenario, there may be fuses or circuit breakers in-line with the positive single conductor cable 46.

Sensors and Algorithms

Figure 6:
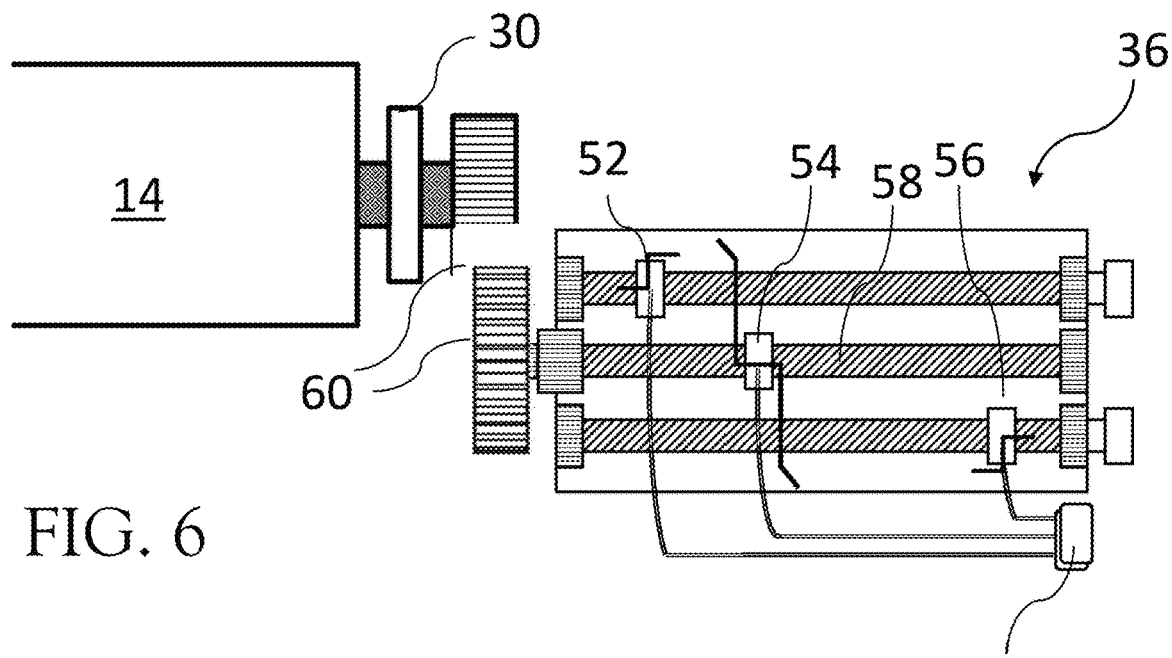
FIG. 6 shows a mechanical limit sensor coupled to the tarp motor.
Figure 7:
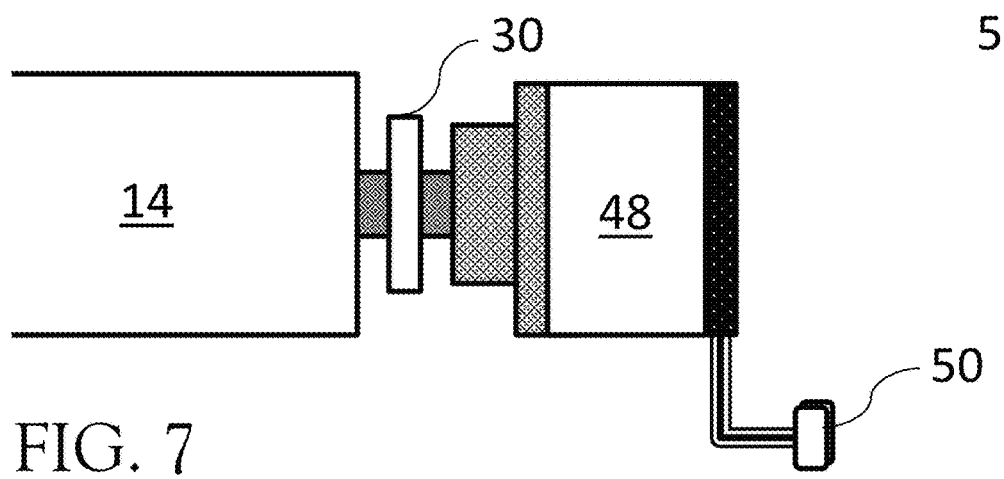
FIG. 7 shows an optical encoder coupled to the tarp motor.
Figure 8:
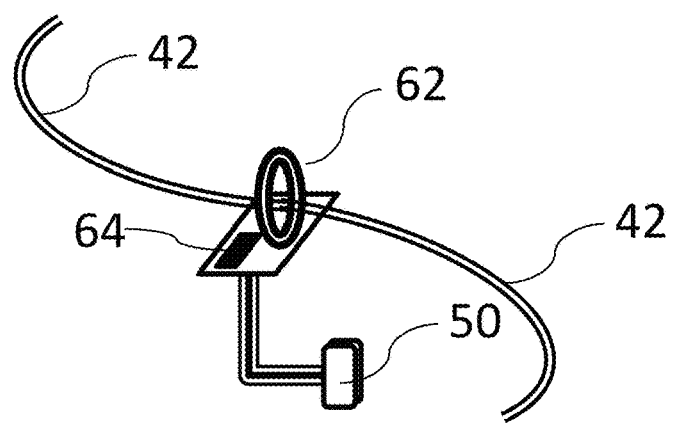
FIG. 8 shows a current measurement sensor on a power cable.

As stated earlier, it is envisioned that more complex circuitry would be utilized for the control block of FIG. 2. FIGS. 6-8 show sensors which provide information relative to the tarp's 12 position, which may be provided to a controller 26.

FIG. 6 shows a mechanical limit switch 36 which is coupled to the spool 14 shaft. A moving threaded nut 54 traverses on a central threaded rod 58 which is coupled to the spool 14 shaft via a geared 60 configuration. The threaded nut 54 carries an electrical filament which moves in conjunction with the threaded nut 54. An upper rod and lower threaded rod are in parallel to the central threaded rod 58 and have upper and lower set nuts 52 and 56. The upper set nut 52 has an electrical filament which makes contact with the electrical filament of the moving threaded nut 54 when the moving threaded nut 54 has traversed to a predefined upper limit. The lower set nut 56 has an electrical filament which makes contact with the electrical filament of the moving threaded nut 54 when the moving threaded nut 54 has traversed to a predefined lower limit. The upper and lower limit are set to correspond to the fully retracted and fully extended position of the tarp 12. Wires attached to each of the aforementioned filaments come out of the sensor and terminate at a connector 50. When the sensor detects an upper or lower limit has been reached, the controller 26 will detect a short between the wire attached to the moving threaded nut and either the wire attached to the upper set nut 52 or wire attached to the lower set nut 56.

FIG. 7 shows an encoder 48 which is coupled to the spool 14 shaft. It is common for a microcontroller circuit to read the signals from an encoder 48 to determine position information. This sensor, while capable of providing detailed electrical position via electrical encoding, is included in the control algorithm of FIG. 9 as a mechanical limit switch.

FIG. 8 illustrates a current sensor 62 which can monitor the current at any point along the electrical path between the battery 24 and the motor 10, including the ground path. In one embodiment, the current sensor 62 may be a hall-effect type sensor. In another embodiment, the current sensor 62 may be a clamp style sensor. In yet another embodiment, the current sensor 62 may be a precision, low-impedance resistor where a voltage drop across the resistor may be monitors by an ADC on a microcontroller 64. In yet another embodiment, the ADC of the microcontroller 64 may indirectly read the voltage across the motor terminals.

Figure 11:
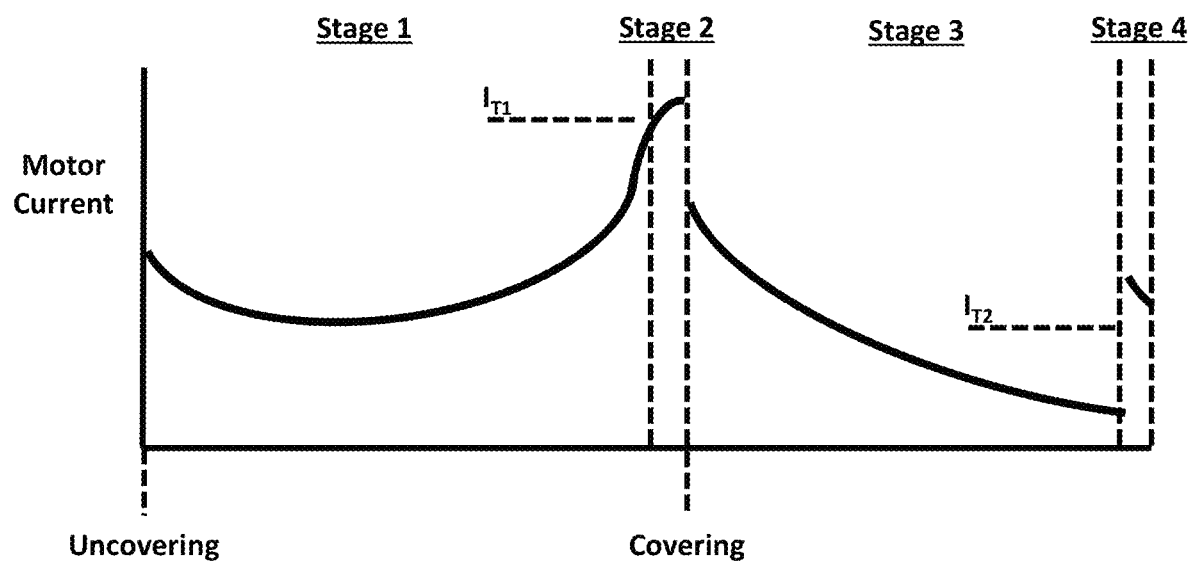
FIG. 11 shows the motor electrical current during operation as the tarp covers and uncovers the vehicle bed.

FIG. 11 illustrates how the current reading may be used to indicate limits of the tarping system. When the tarp 12 is fully extended as shown in Stage 1, the initial torque must both pull and lift the tarp 12, so the initial current draw is higher than mid-point in uncovering process. As the tarp 12 approaches the uncovered point, the current again begins to rise as the motor eventually stalls (Stage 2). A current threshold of $I_{T1}$ is shown to indicate where the controller 26 may determine the tarp 12 is fully retracted.

During the covering process, the motor 10 releases the tarp 12 at a controlled speed as the tarp 12 is being pulled by the bail arms 20. The current during the covering process is continually declining as tarp reaches the fully deployed position. Once fully deployed, if the motor continues to spin in the same direction, the spool will begin to reverse wind and the current will sharply rise as the motor once again begins pulling the tarp back and up (Stage 4). The sudden increase in current to detect the fully covered position is shown as $I_{T2}$.

Figure 9:
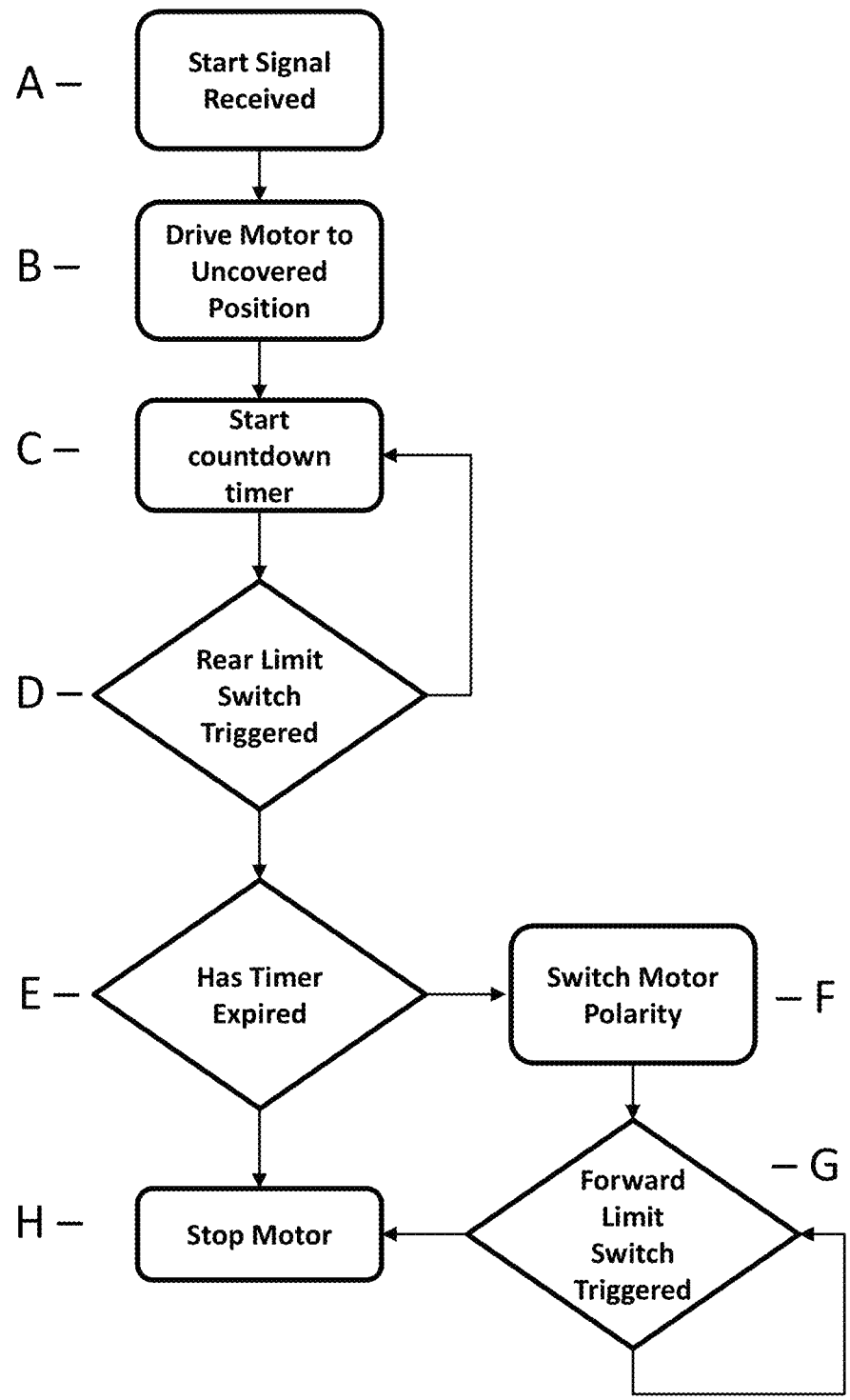
FIG. 9 provides a flow chart for the controller utilizing a mechanical limit sensor.
Figure 10:
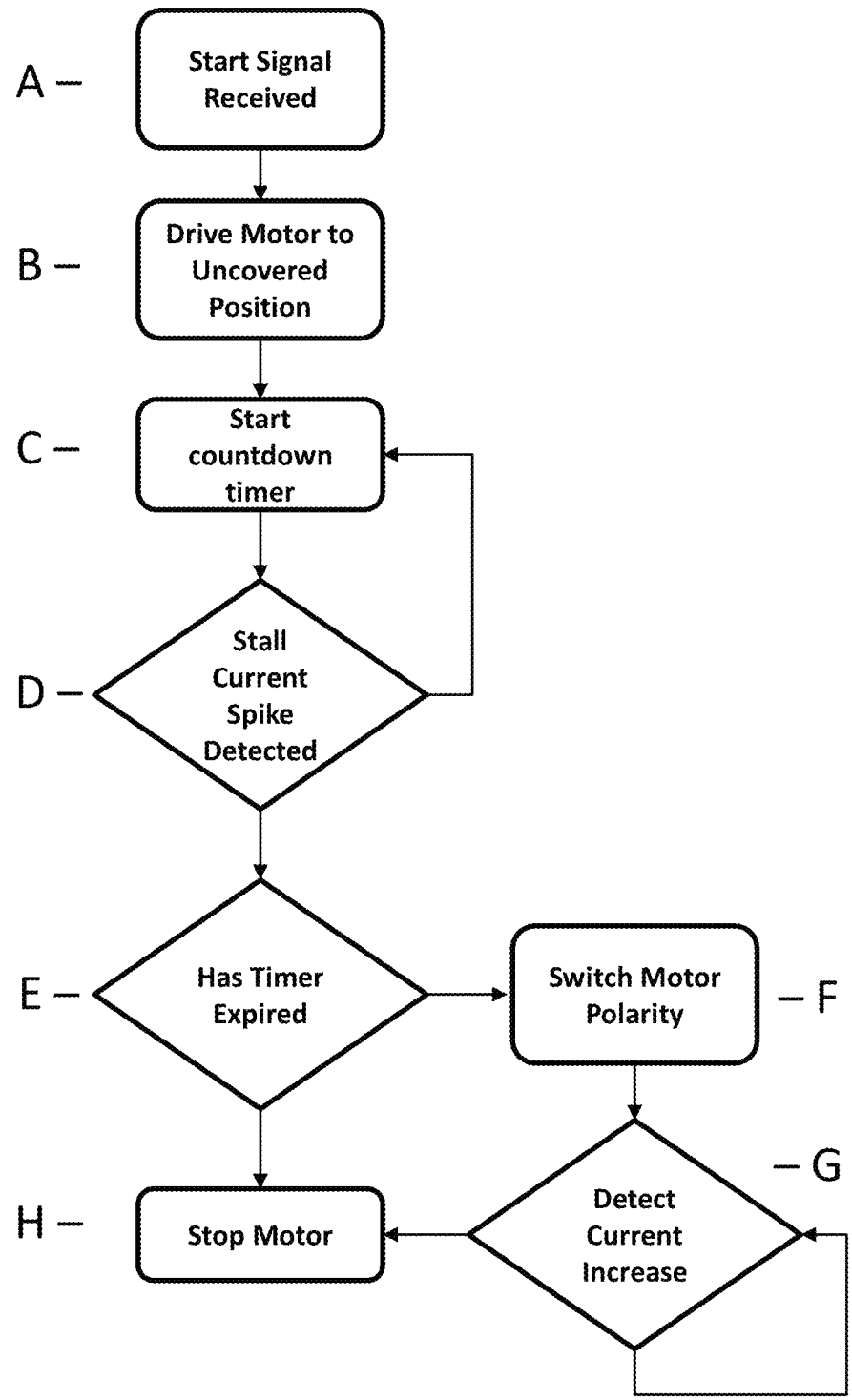
FIG. 10 provides a flow chart for the controller utilizing an electrical current measuring device.

FIG. 9 and FIG. 10 are both flow charts which either utilize a mechanical limit switch or electrical current event to determine the covered or uncovered status of the tarp system. In one embodiment, a start signal, which may be delivered via the control signal line or simply by providing power to the controller (A) will cause the controller to drive motor towards the uncovered position and start a countdown timer. As a non-limiting example, the countdown timer may be 10 seconds whereas to transition from the covered to uncovered would normally take something greater, such as 30 seconds. The motor continues to retract the tarp until the rear limit switch is triggered or the stall current is detected (C). If the countdown timer has expired (E), the controller concludes the tarp was initially covered and stops the motor (H). If the timer is still active (E), the controller concludes that the tarp was initially uncovered and switches the motor polarity to cover the load (F). The motor continues to cover the load until either the forward limit switch is triggered or the reverse wind current $I_{T2}$ is detected (G). Upon detecting this event (G), the controller will stop the motor (H).

What is claimed is:

1. An electrical motor control system for a vehicle tarping system, said motor control system comprising:
    (a) a power supply comprising at least two vehicle batteries each having a nominal voltage, a power supply control signal, a relay, conductor, and electrically conductive and grounded vehicle chassis, wherein upon activation of the power supply control signal
        the relay reconfigures the vehicle's batteries from a parallel battery configuration to a series battery configuration producing a higher than nominal voltage and
        an output of the relay switches from an open circuit to the higher than nominal voltage; and wherein the conductor is connected to said output of the relay, and the vehicle chassis is connected to the lowest voltage of the series battery configuration;
    (b) a motor directional driver configured to receive the conductor and the grounded vehicle chassis and a directional control signal, and further comprising two motor output conductors consisting of motor output A and motor output B, and a switching device configured to selectively pass or invert the higher than nominal voltage potential provided by the conductor and the vehicle chassis onto motor output A and motor output B; and
    (c) an electrical motor in communication with a winding spool of the vehicle tarping system configured to receive motor output A and motor output B.

2. The electrical motor control system of claim 1 wherein the conductor has a wire diameter less than 4 mm.

3. The electrical motor control system of claim 1 wherein the switching device is a double-pole double-throw relay.

4. The electrical motor control system of claim 1 wherein the power supply comprises exactly two batteries.

5. The electrical motor control system of claim 1 wherein the power supply comprises exactly three batteries.

6. An electrical motor control system for a vehicle tarping system, said motor control system comprising: a power supply, a control module, a current detection device, and a tarp motor, wherein
    (a) the power supply comprises a vehicle battery connected and providing power to the control module,
    (b) the control module includes a first and second output configured to provide a differential output voltage, wherein the differential output voltage is selected from a group consisting of positive drive, wherein the first output has a voltage potential higher than the second output, negative drive, wherein the first output has a voltage potential lower than the second output, and non-powered drive, wherein voltage difference between the first output and second output is essentially zero,
    (c) the tarp motor is connected to and receives electrical power from the first and second output of the control module, and is mechanically connected to a spool of the vehicle tarping system which operates between a covered and uncovered position,
    (d) the current detection device provides the control module information correlating the electrical current drawn by the tarp motor under power and the position of the vehicle tarping system, and
    (e) the control module includes an embedded controller having firmware and configured to receive a command signal from a user to initiate either the positive or negative drive onto the tarp motor resulting in a first rotational direction.

7. The electrical motor control system of claim 6 wherein the firmware is configured to transition the differential output from either the positive drive or the negative drive state to the non-powered drive state in response to a predetermined current threshold.

8. The electrical motor control system of claim 6 wherein the firmware is configured to transition the differential output from either the positive drive or the negative drive to the non-powered drive state in response to a positive step function like current measurement correlating to the tarping system transitioning from fully extended to retracting.

9. A battery management system for driving a tarping system motor of a vehicle at a higher voltage than the standard vehicle voltage, said battery management system comprising:
    (a) a power supply comprising a first battery and a second battery, wherein the batteries each have a positive and a negative terminal, the negative terminal of the first battery is connected to the vehicle chassis, and the batteries are configured to selectively transition from a parallel battery configuration to series battery configuration utilizing a control circuit, said control circuit comprising a double-pole double-throw relay activated by a control signal;
    (b) wherein the parallel battery configuration is characterized by a connection through the relay between the positive terminal of the first battery to the positive terminal of the second battery and a connection through the relay between the negative terminal of the first battery to the negative terminal of the second battery; and
    (c) wherein the series battery configuration is characterized by a connection through the relay between the positive terminal of the first battery to the negative terminal of the second battery, thereby producing a differential voltage which is essentially double the standard vehicle voltage between the chassis and the positive terminal of the secondary battery, and where the positive terminal of the second battery is connected through the relay to a conductor;
    (d) wherein the activation of the control signal causes the relay to arrange the batteries into the series battery configuration; and
    (e) wherein the deactivation of the control signal causes the batteries to connect in parallel.

10. The battery management system of claim 9 wherein the vehicle has a cab and the control signal is provided by a momentary contact switch located in the cab of the vehicle.

* * * * *